March 24, 1942. H. G. LEHMANN 2,277,025
COFFEE MAKER
Filed Oct. 27, 1939    2 Sheets-Sheet 1

INVENTOR
Herbert G. Lehmann
BY
ATTORNEYS

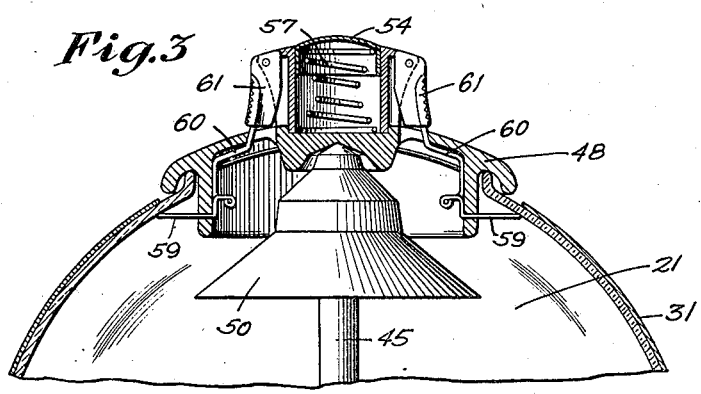
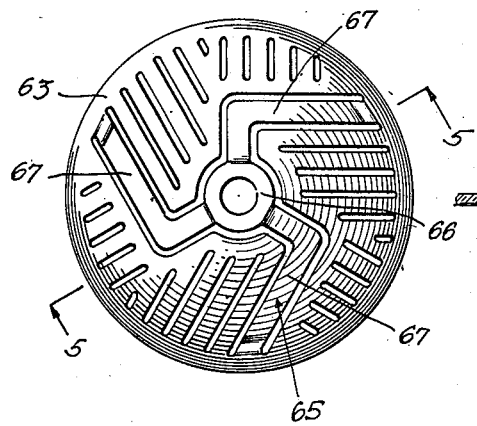
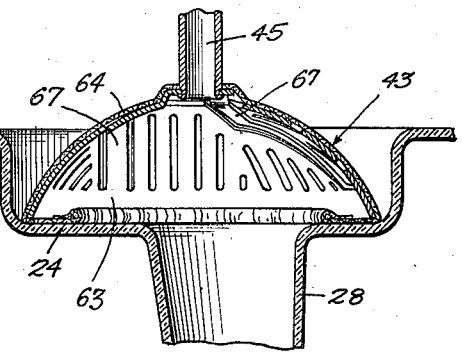
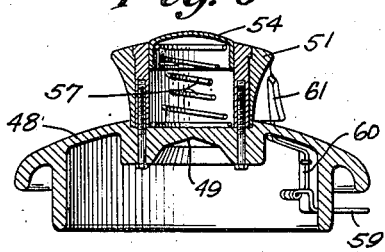
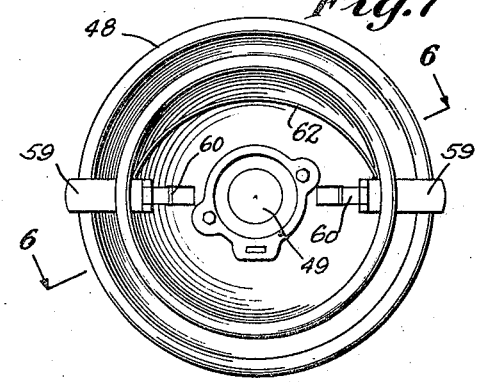

Patented Mar. 24, 1942

2,277,025

UNITED STATES PATENT OFFICE 2,277,025

COFFEE MAKER

Herbert G. Lehmann, Wood-Ridge, N. J., assignor to Casco Products Corporation, Bridgeport, Conn., a corporation of Connecticut Application October 27, 1939, Serial No. 301,524

18 Claims. (Cl. 53—3)

This invention relates to coffee makers, and, more particularly, to the type in which water in a lower vessel is forced by pressure formed above the water due to heating through the ground coffee in an upper vessel, and then subsequently drawn down through the ground coffee as a result of a partial vacuum being formed in the lower or water heating vessel upon cooling of the latter. This type of appliance has been termed a vacuum type coffee maker.

Previous coffee makers of this type have generally consisted of a lower or water heating vessel having a single opening or orifice down into which a hollow stem on the upper or coffee steeping vessel extends. The upper vessel usually is supported on the lower vessel in a manner so as to seal the latter.

Coffee brewed by an appliance such as just described is excellent, but the appliance is cumbersome, and, to pour the coffee after the same had been brewed, it is necessary to remove the upper vessel and store it in some safe place. The storage of the upper vessel presents many times a perplexing problem, for it cannot be supported upright due to the hollow stem projecting from its base, unless it be supported on a holder having an opening to take the tube, and, even when so supported, it is easily tipped over because the center of gravity of the vessel is above the point at which it is supported by the holder.

The heretofore proposed vacuum type coffee makers have presented another difficulty in that it was quite easy to tip them over while the coffee is being brewed, for the superposition of the steeping vessel on the water heating vessel disposed the center of gravity of the appliance relatively high above the supporting surface which is particularly true when the water has been forced up into the upper vessel.

It was found also that when the water from the lower vessel had been expelled to a point where the level thereof is below the orifice of the downwardly projecting tube, bubbles of air were forced up through the liquid in the steeping vessel causing considerable agitation which frequently broke the air-tight seal between the tube of the upper vessel and the lower vessel.

The difficulties above referred to are obviated by the present invention by the provision of a coffee maker of the vacuum type in which the upper or steeping vessel and the lower or water heating vessel are supported together as a unit both while the coffee is being made and while it is being poured from the appliance after being brewed.

The appliance of the present invention permits coffee to be brewed and served at the dining table without the inconvenience and bother which is now attendant upon the removal and storage of the steeping vessel after the coffee is brewed and before it may be served. In the appliance of the present invention also, as the seal between the upper and lower chamber is mechanically maintained at all times, the possibility of the seal between the upper and lower vessels being broken due to agitation of the steeping vessel, either because of the bubbles of air which are sometimes forced up through the liquid, or, because the same was inadvertently jarred, is obviated. This feature of the invention prevents the seepage of air into the lower vessel through this seal, which seepage would delay the return of the brewed coffee to the lower vessel and might even prevent some of the return of the brewed coffee to the lower vessel.

The appliance of the present invention is provided with a pouring spout formed on the lower vessel through which the brewed coffee may be poured. This spout is completely sealed by a suitable stopple during the brewing of the coffee and prevents any egress of air into the lower vessel so that the action of the appliance is in no way impaired.

To prevent the stopple used with the pouring spout from becoming lost after the coffee is brewed, and it is desired to serve the same, the stopple may be stored in a cap closing an opening in the upper vessel and when so stored serves as an actuator for opening a valve in the upper vessel communicating with the lower chamber. The valve when opened permits air to enter the lower vessel so that the brewed coffee may be poured through the spout without being impeded either by the partial vacuum, which would be otherwise formed in the lower vessel after a portion of the coffee had been withdrawn, or by an in-rush of air attempting to enter the lower vessel through the pouring spout.

This valve is held closed during the brewing operating so as to prevent air or water from escaping therethrough from the lower vessel while the coffee is being brewed, and a feature of the present invention is the provision of means for holding this valve closed during the brewing operation. The means for holding the valve closed is made a part of the usual filter means found in this type of appliance for preventing ground coffee from being drawn down into the lower vessel with the brewed coffee. The means for holding the valve closed is rendered ineffective by the storage of the stopple as above mentioned.

Another feature of the present invention is the provision of means on the valve cooperating with means carried by the cap for centering the valve relative to its seat.

Other features and advantages will hereinafter appear.

In the accompanying drawings—

Fig. 3 is a sectional view of the top portion of the upper vessel showing the cover or cap locked thereon.

Fig. 4 is a plan view of the filter plate.

Fig. 5 is a sectional view showing the lower end of the air inlet tube and the filter plate resting in the sump of the upper vessel with the filter cloth mounted in position on the filter plate.

Fig. 6 is a sectional view of the cap.

Fig. 7 is a bottom plan view of the cap with the parts in the positions shown in Fig. 3.

Figure 1:
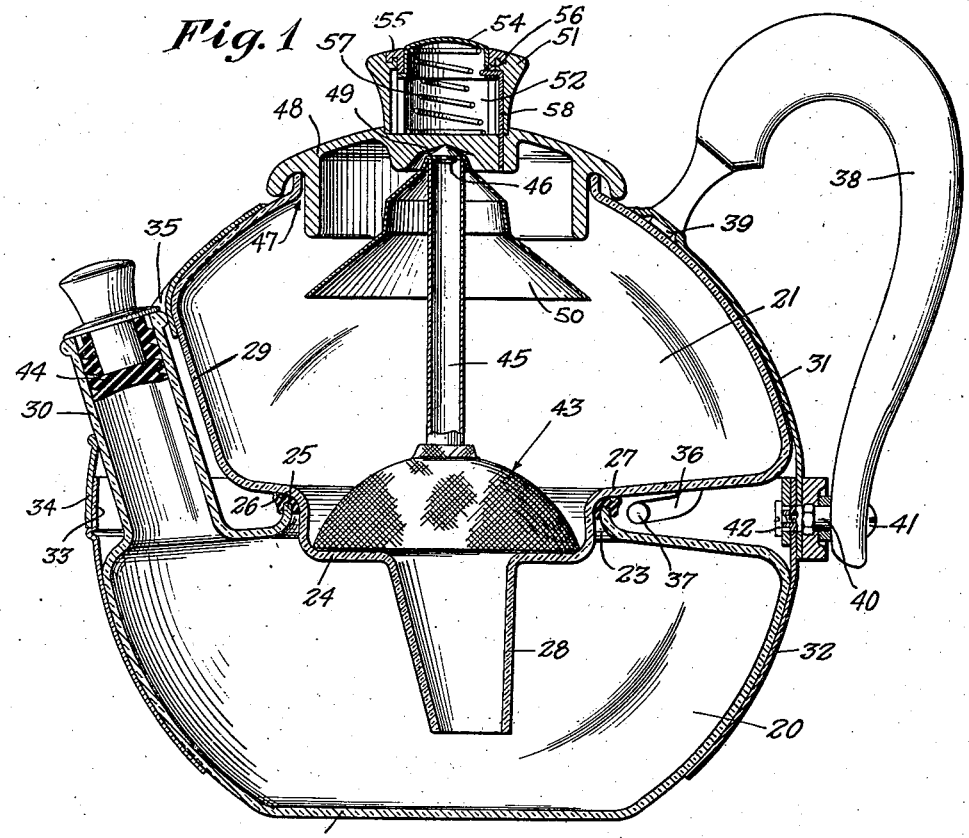
Figure 1 is a vertical section through the coffee maker of the present invention showing the parts in the positions they occupy during the brewing operation.

As shown in the accompanying drawings, referring particularly to Fig. 1, the coffee maker of the present invention comprises a lower or water heating vessel 20 and an upper or steeping vessel 21, both vessels being approximately hemispherical and having their relatively flat sides juxtaposed so that when they are assembled the two vessels form a substantially spherical body.

The bottom of the lower vessel 20 is provided with a flat surface or base 22 by means of which the appliance may be supported upon a suitable surface, and at its upper end the vessel 20 has a relatively wide open mouth 23 adapted to receive a sump portion 24 of the steeping vessel 21. A lip 25 of the mouth 23 supports a gasket 26 of rubber or other suitable material which is engaged by a bottom portion 27 of the steeping vessel 21 and supports the steeping vessel on the lower vessel with the sump 24 extending into the lower vessel. The steeping vessel has the usual downwardly extending tube 28 through which water contained within the bottom vessel 20, when heated, will pass upwardly through ground coffee in the sump 24 and into the steeping vessel 21 where the coffee is brewed.

As shown in Fig. 1, the steeping vessel 21 is suitably shaped as at 29 to provide clearance for an upwardly extending spout 30 communicating with the lower vessel 20, and through which the brewed coffee may be poured.

According to the present invention, the lower vessel 20 and the upper or steeping vessel 21 are held together as a unit and for this purpose any suitable means may be employed. In the now preferred form of the invention, the two vessels are united by a pair of properly shaped casings 31 and 32, overlying and underlying respectively the largest dimensions of the vessels 21 and 20. These casing parts are provided with overlying marginal portions 33 and 34 which are suitably secured together. The upper casing 31 is provided with an aperture 35 through which the pouring spout 30 of the lower vessel extends.

The casing parts 31 and 32 may be secured together by any suitable means, but preferably are secured together by bayonet locks comprising slots 36 formed in the casing part 32 and pins 37 carried by the casing part 31. After the vessels 20 and 21 are superposed, the parts 31 and 32 are placed over and under the vessels so that the pins 37 enter the slots 36, whereupon the lower casing part is turned relative to the upper casing part causing the parts to be drawn together by the inclined walls of the slots 36.

Any suitable handle may be employed and, as herein shown, the handle 38 is secured at the upper end to casing part 31 by a rivet 39 and by a threaded coupling 40 into the opposite ends of which screws 41 and 42 are threaded.

To prevent coffee grounds held by the sump 24 from being drawn down through the spout 28 into the lower vessel, after the brewing operation, a suitable filter or strainer is used to retain the coffee grounds in the sump 24.

In the broader aspects of the invention, any suitable filter or strainer may be used, but, in the form of the invention herein disclosed, this is accomplished by providing a filter 43 which fits over the opening at the upper end of the tube 28 and which may be covered with some suitable cloth to strain the brewed coffee and prevent the grounds from passing down into the lower vessel.

It is necessary to prevent the escape of air and water vapor from the lower vessel 20 as the water is heated because it is the expansion of the air and water vapor above the water level in the lower vessel which forces the water therein to rise in the tube 28 and enter the steeping vessel. To prevent the loss of air and water vapor from the lower vessel 20, the spout 30 is provided with a stopple 44 which is removed when it is desired to pour or serve the brewed coffee.

When the brewed coffee is to be poured from the lower vessel it is necessary, to insure a smooth pouring action, that the liquid removed be replaced by air. It cannot be supplied through the pouring spout without affecting the pouring action of the spout so that it is necessary to provide means for allowing air to enter the lower vessel through other means of entrance than the pouring spout 30.

The ground coffee in the sump 24 packs so tightly against the filter 43 after the coffee has been drawn back into the lower vessel that sufficient air cannot enter the lower vessel through the wet coffee grounds.

Means must be provided, therefore, for supplying air to the lower vessel as the vessel is emptied. Any suitable means may be employed but, in the specific embodiment of the invention, illustrated herein, as exemplary thereof, this is accomplished by providing an air inlet tube 45 and, conveniently, this air inlet tube may be secured to and be supported by the filter 43. This tube extends upwardly from the sump 24 to a point near the top of the upper vessel and is held closed against the passage of air or water while the water in the lower vessel 20 is being heated.

If the air inlet tube was not held closed to prevent the passage of air or water vapor, while the water in the lower vessel 20 was being heated, insufficient pressure would be generated above the water level in the water vessel to force the water up through the filter 43 and into the steeping vessel 21.

For the purpose of normally closing the air inlet tube 45, the upper end of the tube is provided with a valve 46 normally seating on the upper end of the tube and sealing the same against the passage of air and water vapor.

To prevent the valve 46 from rising, the mouth 47 of the steeping vessel is provided with a cap 48. The cap 48 is formed with a conical shaped concave undersurface 49 which engages a conical head on the valve 46 when the cap 48 is in position and normally centers the valve relative to the mouth of the tube and maintains it seated thereon. The valve 46 is provided with a skirt or hood 50 extending downwardly about the upper end of the tube 45. Secured to the cap 48 by suitable screws is a knob or handle member 51 having a central recess 52 within which rides a flanged disk 54.

A band 55 of some suitable metal is preferably molded within the knob 51 and forms a shoulder 56 against which the flange of the disk is normally urged by a spring 57. The disk 54 carries a downwardly extending lug 58 and the cap 48 is formed with a suitable passage to accommodate the lug which has a sliding fit therein.

Figure 2:
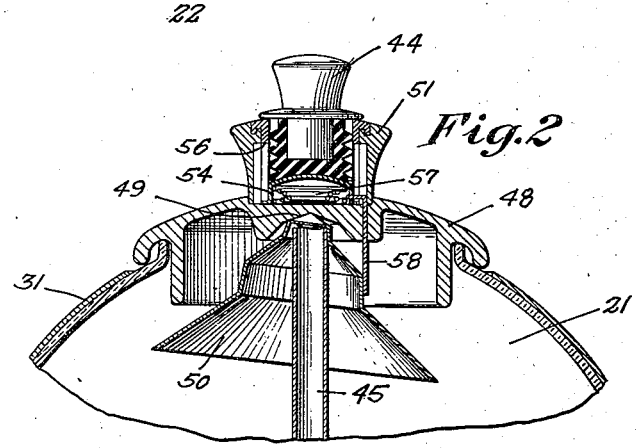
Fig. 2 is a sectional view of the upper portion of the coffee maker showing the parts of the cap in the positions they occupy during the pouring of the brewed coffee.

When the disk 54 is pushed down, the lug 58 is also urged downwardly and engages the conical shaped hood 50 carried by the valve 46 and tilts the hood to one side, as shown in Fig. 2, thereby rocking the valve about the point formed by the apex of the hood and raising the valve 46 from one side of the tube 45 and permitting air to enter the same.

The skirt or hood of the valve also forms, as will be seen, a deflector plate to prevent liquid from splashing onto the cap and seeping out of the upper vessel through the mouth thereof.

The disk 54 may be held down in any suitable manner, but, according to the invention in its illustrated form, the disk is depressed and maintained depressed by the stopple 44 which, when it is removed from the spout 30, may be disposed within the recess 52 against the disk 54 and pressed downward to the position shown in Fig. 2 where it is frictionally held until again removed. Thus, not only is the air vent valve automatically operated by the insertion of the stopper, but a convenient place to store the stopple during the pouring of the brewed coffee is provided.

The cap 48 does not have an air-tight fit within the mouth of the steeping vessel, and, therefore, the interior of the steeping vessel also has free communication with the atmosphere.

To prevent the cap 48 from unseating within the mouth of the steeping vessel, a pair of slide bolts 59 are provided and extend under the annular lip at the mouth of the steeping vessel 21. The slide bolts are pivotally attached to arms 60 which, in turn, are attached to finger pieces 61 by means of which they may be swung inwardly. The finger pieces 61 extend outwardly through suitable slots formed in the cap 48 and are held in their outward position with the slide bolts in the position shown in Fig. 3 by a spring 62 shown in Fig. 7. The slide bolts 59 engaging the downwardly and outwardly inclined surface of the upper vessel and being spring-pressed outwardly tend to draw the cap 48 tightly against the mouth of the vessel 21 holding the valve 46 against the air inlet tube.

To insure that the valve 46 is held tightly against the mouth of the air inlet tube, the filter plate shown in Figs. 4 and 5 is employed to exert an upward force against the tube so as to clamp the valve 46 between the cap and the air inlet tube. The filter plate, as clearly shown in Fig. 4, comprises a perforated rigid dish-shaped plate 63, about which a suitable filtering cloth 64 may be fitted. A spider member 65 is struck from the filter plate and comprises a body 66 having a plurality of legs 67 integrally formed with the plate 63.

The body portion 66 of the spider member is secured to the air inlet tube by means of a groove formed at the lower end of the tube, which receives the defining edges of a centrally located aperture formed in the body portion 66, and held therein by peening over the lower end of the air inlet tube.

The spider member, when the filter plate and air inlet tube are assembled, as shown in Fig. 1, with the conical head of the valve engaging the concave undersurface of the cap, is under tension, and a substantial part of the spider member lies beneath the dome-shaped filter plate. The spider member, being under tension, attempts to return to its normal position and urges the air inlet tube upward so that the conical head of the valve is tightly pressed against the undersurface of the cap. This will insure that the valve will be properly seated on the air-inlet tube, even though there may be the ordinary variations in the size and shape of the steeping vessel 21.

The action of the spider member will not be affected by the partial vacuum formed in the lower vessel after the water heated therein has been forced up into the steeping vessel, for the spider member, in the assembled position, lies beneath the rigid dome-shaped filter plate. The spider therefore will not take any normal pressure exerted against the filter plate.

If, for some reason, the brewed coffee was not able to return to the lower vessel, as sometimes does happen in vacuum type coffee makers, all danger of the lower vessel collapsing is prevented by the present invention, for any pressure substantially greater than the normal one encountered in the use of the device will urge the spider member downward a distance sufficient to pull the air inlet tube downward and allow air to enter through the top thereof.

Variations and modifications may be made within the scope of this invention and portions of the improvements may be used without others.

I claim:

1. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; a pouring spout on the lower vessel; means for closing the spout against the passage of air while the water in the lower vessel is being expelled through the said tube and while the brewed coffee is returning to the lower vessel; an air duct in the upper vessel communicating directly with the tube thereon which enters the lower vessel; a valve associated with said air duct; and means for resiliently and yieldingly holding said valve closed to prevent the passage of air through said air duct, said valve adapted to be manually opened when the brewed coffee is to be served from said lower vessel through said spout to permit the passage of air into said lower vessel.

2. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; a pouring spout on the lower vessel; means for closing the spout against the passage of air while the water in the lower vessel is being expelled through the said tube and while the brewed coffee is returning to the lower vessel, said upper vessel having an opening at its top; a cap for covering said opening during the brewing of coffee; a filtering device carried by said upper vessel to prevent ground coffee from passing down through said tube into the lower vessel; an air-inlet tube extending through said filtering device and any ground coffee which might be retained by the latter and extending vertically through said upper vessel to a point adjacent said cap; a valve carried by the air inlet tube at the top thereof; and means for securing said air inlet tube to said filter plate, said means resiliently and yieldingly urging said tube towards said cap and holding said valve against the undersurface of said cap and tightly seated on said tube.

3. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; a pouring spout on the lower vessel; means for closing the spout against the passage of air while the water in the lower vessel is being expelled through the said tube and while the brewed coffee is returning to the lower vessel; a combined filter means and air inlet means mounted in said upper vessel comprising a plate for supporting a filtering medium and an air inlet tube mounted on and extending through said plate and in communication with the tube on the upper vessel extending into the lower vessel, said air inlet tube extending to a point above the highest liquid level in said upper vessel; a valve seating on the upper end of the tube; a cap closing an opening in the upper vessel; and means associated with said plate for urging said tube upward and holding said valve tightly against the undersurface of said cap.

4. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee, a pouring spout on the lower vessel; means for closing the spout against the passage of air while the water in the lower vessel is being expelled through the said tube and while the brewed coffee is returning to the lower vessel; air inlet means for permitting free passage of air into the lower vessel after the coffee is brewed and while it is being poured; a cap for closing an opening at the top of the lower vessel; valve means associated with said air inlet means for preventing the passage of air into the lower vessel while the water in the lower vessel is being expelled through the tube and while the brewed coffee is returning to the lower vessel; means carried by said air inlet means, cooperating with said cap for resiliently and yieldingly holding said valve normally closed; and means associated with said cap for opening said valve when it is desired to pour the coffee from the lower vessel.

5. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; a pouring spout on the lower vessel; means for closing the spout against the passage of air while the water in the lower vessel is being forced up through the said tube and while the brewed coffee is returning to the lower vessel, said upper vessel having an opening at its top; a cap for covering said opening during the brewing of coffee; a filtering device carried by said upper vessel to prevent ground coffee from passing down through said tube into the lower vessel; an air-inlet tube extending through said filtering device and any ground coffee which might be retained by the latter and extending vertically through said upper vessel to a point adjacent said cap; and a valve seating on said tube at the upper end thereof, said valve directly engaged by and held against the mouth of the tube by said cap.

6. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; a pouring spout on the lower vessel; means for closing the spout against the passage of air while the water in the lower vessel is being expelled through the said tube and while the brewed coffee is returning to the lower vessel, said upper vessel having an opening at its top; a cap for covering said opening during the brewing of coffee; a filtering device carried by said upper vessel to prevent ground coffee from passing down through said tube into the lower vessel; an air inlet tube extending through said filtering device and any ground coffee which might be retained by the latter and extending vertically through said upper vessel to a point adjacent said cap; a valve carried by the air inlet tube at the top thereof; means for securing said air inlet tube to said filter plate, comprising means integral with said filter plate and secured to said air inlet tube for resiliently and yieldingly urging said tube upward to hold said valve against the undersurface of said cap and tightly seated on said tube; and a conical head carried by said valve, the apex thereof projecting into a substantially conical shaped cavity formed in the undersurface of said cap and engaging the walls thereof, said walls serving as guide surfaces to center said valve relative to said tube.

7. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; a pouring spout on the lower vessel; means for closing the spout against the passage of air while the water in the lower vessel is being expelled through the said tube and while the brewed coffee is returning to the lower vessel, said upper vessel having an opening at its top; a cap for covering said opening during the brewing of coffee; a filtering device carried by said upper vessel to prevent ground coffee from passing down through said tube into the lower vessel; an air inlet tube extending through said filtering device and any ground coffee which might be retained by the latter and extending vertically through said upper vessel to a point adjacent said cap; a valve seating on said tube and held closed by said cap; and means for exerting an upward force against said tube to resiliently hold said valve against the undersurface of said cap and on said tube.

8. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; a pouring spout on the lower vessel; means for closing the spout against the passage of air while the water in the lower vessel is being expelled through the said tube and while the brewed coffee is returning to the lower vessel, said upper vessel having an opening at its top; a cap for covering said opening during the brewing of coffee; a filtering device carried by said upper vessel to prevent ground coffee from passing down through said tube into the lower vessel; an air inlet tube extending through said filtering device and any ground coffee which might be retained by the latter and extending vertically through said upper vessel to a point adjacent said cap; a valve seating on said tube and held closed by said cap; and means for exerting an upward force against said tube to resiliently hold said valve against the undersurface of said cap and on said tube, said means forming a part of said filtering device.

9. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; a pouring spout on the lower vessel; means for closing the spout against the passage of air while the water in the lower vessel is being expelled through the said tube and while the brewed coffee is returning to the lower vessel, said upper vessel having an opening at its top; a cap for covering said opening during the brewing of coffee, said cap having means for receiving and holding said spout-closing means when the latter is removed from the spout to permit the brewed coffee to be poured; filter means carried by said upper vessel for preventing ground coffee from passing down said tube into the lower vessel; an air inlet tube extending through said filter means and vertically upward in said upper vessel to a point adjacent said cap; a valve carried by and seating on said tube for closing the same while the water in the lower vessel is being forced up through said first-named tube and while the brewed coffee is returning to the lower vessel; and means on the cap for opening said valve, the reception and holding of the spout-closing means by the means of the cap incidentally actuating said last-named means and opening said valve.

10. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; a pouring spout on the lower vessel; means for closing the spout against the passage of air while the water in the lower vessel is being expelled through the said tube and while the brewed coffee is returning to the lower vessel, said upper vessel having an opening at its top; a cap for covering said opening during the brewing of coffee; a filtering device carried by said upper vessel to prevent ground coffee from passing down through said tube into the lower vessel; an air inlet tube extending through said filtering device and any ground coffee which might be retained by the latter and extending vertically through said upper vessel to a point adjacent said cap; a valve seating on the upper end of said air inlet tube; means carried by said air inlet tube for resiliently and yieldingly holding said valve in normally closed position; and a valve actuating mechanism carried by said cap and including a spring-pressed disk carrying a finger adapted to be moved into engagement with said valve to tilt the same and open said air inlet tube when the disk is depressed, said valve actuating mechanism including means for storing the spout closing means, the storage of said spout-closing means incidentally depressing said disk and causing said finger to tilt said valve and open the air inlet tube.

11. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; a pouring spout on the lower vessel; means for closing the spout against the passage of air while the water in the lower vessel is being expelled through the said tube and while the brewed coffee is returning to the lower vessel, said upper vessel having an opening at its top; a cap for covering said opening during the brewing of coffee; a filtering device carried by said upper vessel to prevent ground coffee from passing down through said tube into the lower vessel; an air inlet tube extending through said filtering device and any ground coffee which might be retained by the latter and extending vertically through said upper vessel to a point adjacent to said cap; a valve seating on the upper end of the air inlet tube; an outwardly flared plate carried by said valve for deflecting liquid splashed upwardly; a disk carried by said cap resiliently held in one position; and means carried by said cap for engaging the flared plate of the valve when the disk is depressed for camming the same aside and tilting the valve to open the same and permit air to pass through the air inlet tube.

12. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; a pouring spout on the lower vessel; means for closing the spout against the passage of air while the water in the lower vessel is being expelled through the said tube and while the brewed coffee is returning to the lower vessel, said upper vessel having an opening at its top; a cap for covering said opening during the brewing of coffee; a filtering device carried by said upper vessel to prevent ground coffee from passing down through said tube into the lower vessel; an air inlet tube extending through said filtering device and any ground coffee which might be retained by the latter and extending vertically through said upper vessel to a point adjacent said cap; a valve, and mechanism in said cap operating the valve for closing and opening said air inlet tube; said valve comprising a valve closure seated on the upper end of the air inlet tube, and a flared plate carried by said valve closure for deflecting liquid splashed upwardly; and said mechanism comprising a disk carried by said cap resiliently held in one position, and means carried by said cap for engaging the flared plate of the valve closure when the disk is depressed for camming the same aside and tilting the valve closure to open the valve and permit air to pass through the air inlet tube, the depression of said disk permitting the storage of said spout-closing means within the cap, and the storage of said spout-closing means incidentally holding said disk depressed and the valve closure tilted.

13. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; a pouring spout on the lower vessel; means for closing the spout against the passage of air while the water in the lower vessel is being expelled through the said tube and while the brewed coffee is returning to the lower vessel, said upper vessel having an opening at its top; a cap for covering said opening during the brewing of coffee; a filtering device carried by said upper vessel to prevent ground coffee from passing down through said tube into the lower vessel; an air inlet tube extending through said filtering device and any ground coffee which might be retained by the latter and extending vertically through said upper vessel to a point adjacent said cap; a valve seating on the upper end of said air inlet tube for closing the same; means carried by said air inlet tube, cooperating with said cap, for resiliently and yieldingly holding said valve seated on said tube; means formed on said cap for centering said valve on said tube; and means carried by said cap for opening said valve to allow the passage of air through said air inlet tube, said means including means cooperating with said valve to tilt the same and open the air inlet tube.

14. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; a pouring spout on the lower vessel; means for closing the spout against the passage of air while the water in the lower vessel is being expelled through the said tube and while the brewed coffee is returning to the lower vessel, said upper vessel having an opening at its top; a cap for covering said opening during the brewing of coffee; a filtering device carried by said upper vessel to prevent ground coffee from passing down through said tube into the lower vessel; an air inlet tube extending through said filtering device and any ground coffee which might be retained by the latter and extending vertically through said upper vessel to a point adjacent said cap; a valve carried by the air inlet tube at the top thereof; and a conical head carried by said valve, the apex thereof projecting into a substantially conical shaped cavity formed in the undersurface of said cap and engaging the walls thereof, said walls serving as guide surfaces to center said valve relative to said tube.

15. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; a pouring spout on the lower vessel; means for closing the spout against the passage of air while the water in the lower vessel is being expelled through the said tube and while the brewed coffee is returning to the lower vessel, said upper vessel having an opening at its top; a cap for covering said opening during the brewing of coffee; a filtering device carried by said upper vessel to prevent ground coffee from passing down through said tube into the lower vessel; an air inlet tube extending through said filtering device and any ground coffee which might be retained by the latter and extending vertically through said upper vessel to a point adjacent said cap; a valve carried by the air inlet tube at the top thereof; a conical head carried by said valve, the apex thereof projecting into a substantially conical shaped cavity formed in the undersurface of said cap and engaging the walls thereof, said walls serving as guide surfaces to center said valve relative to said tube; and means carried by said cap for rocking said valve about the fulcrum point established by the apex of the said conical head for tilting said valve and permitting air to enter said tube.

16. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; a pouring spout on the lower vessel; means for closing the spout against the passage of air while the water in the lower vessel is being forced up through the said tube and while the brewed coffee is returning to the lower vessel, said upper vessel having an opening at its top; a cap for covering said opening during the brewing of coffee; a filtering device carried by said upper vessel to prevent ground coffee from passing down through said tube into the lower vessel; an air inlet tube extending through said filtering device and any ground coffee which might be retained by the latter and extending vertically through said upper vessel to a point adjacent said cap; and a valve carried by and removably seating on said tube at the upper end thereof, said valve being directly engaged by and held against the mouth of the tube by said cap when the same is disposed in the opening at the top of the upper vessel.

17. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; a pouring spout on the lower vessel; means for closing the spout against the passage of air while the water in the lower vessel is being expelled through the said tube and while the brewed coffee is returning to the lower vessel, said upper vessel having an opening at its top; a cap for covering said opening during the brewing of coffee, said cap having means for receiving and holding said spout-closing means when the latter is removed from the spout to permit the brewed coffee to be poured; filter means carried by said upper vessel for preventing ground coffee from passing down said tube into the lower vessel; an air inlet tube extending through said filter means and vertically upward in said upper vessel to a point adjacent said cap; a valve carried by and seating at the upper end of said tube; means associated with said filter means for urging said tube upwardly and the valve carried thereby into engagement with the undersurface of said cap for normally preventing the passage of air through said air inlet tube while the water in the lower vessel is being forced up through said first-named tube and while the brewed coffee is returning to the lower vessel; and valve opening means carried by said cap and actuated by the reception of said spout-closing means in said holding means for opening said valve to allow air entry into the lower vessel when it is desired to pour the brewed coffee.

18. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; a pouring spout on the lower vessel; means for closing the spout against the passage of air while the water in the lower vessel is being expelled through the said tube and while the brewed coffee is returning to the lower vessel, said upper vessel having an opening at its top; a cap for covering said opening during the brewing of coffee, said cap having means for receiving and holding said spout-closing means when the latter is removed from the spout to permit the brewed coffee to be poured; filter means carried by said upper vessel for preventing ground coffee from passing down said tube into the lower vessel; an air inlet tube extending through said filter means and vertically upward in said upper vessel to a point adjacent said cap; a valve carried by and seating at the upper end of said tube; means associated with said filter means for urging said tube upwardly and the valve carried thereby into engagement with the undersurface of said cap for normally preventing the passage of air through said air inlet tube while the water in the lower vessel is being forced up through said first-named tube and while the brewed coffee is returning to the lower vessel; and manually operable means carried by said cap for opening said valve to allow air entry into the lower vessel when it is desired to pour the brewed coffee, said means being so formed that the reception and storage of the spout-closing means within the holding means of the cap actuating said last-named means and opening said valve, the valve being held open as long as the spout-closing means is received and stored by the holding means of the cap.

HERBERT G. LEHMANN.